(12) United States Patent
Kim et al.

(10) Patent No.: US 9,264,155 B2
(45) Date of Patent: Feb. 16, 2016

(54) APPARATUS AND SYSTEM FOR TRACKING DATA SPEED AUTOMATICALLY

(71) Applicant: Korea University Research and Business Foundation, Seoul (KR)

(72) Inventors: Chulwoo Kim, Seoul (KR); Yeonho Lee, Gyeonggi-do (KR); Junyoung Song, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/446,917

(22) Filed: Jul. 30, 2014

(65) Prior Publication Data

US 2015/0036730 A1    Feb. 5, 2015

(30) Foreign Application Priority Data

Jul. 31, 2013   (KR) ........................ 10-2013-0091079
Jul. 7, 2014   (KR) ........................ 10-2014-0084632

(51) Int. Cl.
    *H04L 1/00*         (2006.01)
    *H04B 17/00*       (2015.01)
    *H04L 7/033*       (2006.01)
    *H04L 25/02*       (2006.01)

(52) U.S. Cl.
    CPC ............. *H04B 17/003* (2013.01); *H04L 7/033* (2013.01); *H04L 25/0272* (2013.01)

(58) Field of Classification Search
    CPC ............ H04L 25/0264; H04L 25/0272; H04L 25/085; H04L 25/0262
    See application file for complete search history.

(56) References Cited

U.S. PATENT DOCUMENTS

| | | | | |
|---|---|---|---|---|
| 4,740,994 A | * | 4/1988 | Ouchi ................ | H04L 25/4915 358/1.9 |
| 8,194,780 B2 | * | 6/2012 | Tsukamoto ......... | G06F 13/4291 375/286 |
| 2008/0265964 A1 | * | 10/2008 | Park ............................. | 327/257 |
| 2009/0219072 A1 | * | 9/2009 | Sobue ................ | H04L 25/0282 327/199 |

FOREIGN PATENT DOCUMENTS

JP       2009-186502     8/2009
KR      10-0684328      12/2005

* cited by examiner

*Primary Examiner* — Sophia Vlahos
(74) *Attorney, Agent, or Firm* — Mintz Levin Cohn Ferris Glovsky and Popeo, P.C.; Kongsik Kim; Jonathon Western

(57) ABSTRACT

An apparatus and a system for automatically tracking data speed are disclosed. An embodiment of the invention provides a transmitting apparatus for automatically tracking data speed that includes: an encoder configured to convert parallelized input data according to a preset signal rule into a first signal and a second signal, where the input data is inputted as a unit of n bits, the encoder outputs the first signal and the second signal such that, if the input data includes identical bit values consecutively, one of the first signal and the second signal is converted to include transition information instead of following a differential rule with respect to the other signal; a serializer configured to serialize the first signal and the second signal; and a transmitting part configured to transmit the serialized first signal and second signal.

10 Claims, 7 Drawing Sheets

```
P branch                    N branch
000 ──→ |101| ──→ ①'        000 ──→ |000| ──→ ①'
001 ──→  110                001 ──→  001
010 ──→ |101| ──→ ①         010 ──→ |010| ──→ ①
011 ──→  100                011 ──→  011
100 ──→  011                100 ──→  100
101 ──→ |010| ──→ ②         101 ──→ |101| ──→ ②
110 ──→  011                110 ──→  110
111 ──→ |000| ──→ ②'        111 ──→ |101| ──→ ②'
```

FIG. 1

APPARATUS AND SYSTEM FOR TRACKING DATA SPEED AUTOMATICALLY

CROSS-REFERENCE TO RELATED APPLICATIONS

This application claims priority to Korean Patent Application No. 10-2013-0091079 filed on Jul. 31, 2013 and Korean Patent Application No. 10-2014-0084632 filed on Jul. 7, 2014, which applications are incorporated herein by reference.

BACKGROUND

1. Technical Field

The present invention relates to an apparatus and a system for automatically tracking data speed, more particularly to an apparatus and a system that enables a receiving apparatus to recover a clock and input data without a reference clock.

2. Description of the Related Art

An apparatus for automatic data speed tracking is an apparatus for recovering a clock without a reference clock or a reference clock transmission line. The performance, transmission speed, complexity, etc., of the apparatus may vary according to the recovery method used.

One of the automatic data speed tracking methods most used in the related art is the clock embedded method, in which a clock is sent in regular intervals instead of data, so that a clock matching the data speed can be recovered at the receiving end by using the clock transmitted at regular intervals.

This method provides the advantage that the transmission speed of the data can be found easily, but since a clock is sent at regular intervals instead of data, the transmission speed is limited.

The number of bits added thus is referred to as overhead, and several methods for reducing overhead have been developed.

Another method of automatically tracking data speed is to recover a clock by finding the regularity of the data. With this method also, however, transition information is required for finding the regularity, so that a method such as 8B10B encoding is used which adds overhead. Moreover, this method may result in a large area and high power consumption for finding the regularity.

SUMMARY

To resolve the above problems, an aspect of the invention aims to provide an apparatus for tracking data speed automatically that can alleviate existing restraints, such as limits on data transmission speed, and the complexity, area, power consumption, and DC balance of the circuit, by using a conversion method that limits run length.

To achieve the objective above, an embodiment of the invention provides a transmitting apparatus for automatically tracking data speed that includes: an encoder configured to convert parallelized input data according to a preset signal rule into a first signal and a second signal, where the input data is inputted as a unit of n bits, the encoder outputs the first signal and the second signal such that, if the input data includes identical bit values consecutively, one of the first signal and the second signal is converted to include transition information instead of following a differential rule with respect to the other signal; a serializer configured to serialize the first signal and the second signal; and a transmitting part configured to transmit the serialized first signal and second signal.

The apparatus can further include a differential output driver that is configured to receive the first signal and the second signal as differential signals from the serializer and output the first signal and the second signal in inverted forms, where the transmitting part can transmit the inverted first signal and second signal to a receiving apparatus.

The differential output driver can include a differential circuit and a control circuit, where the differential circuit can be composed of multiple switches, and the control circuit can be turned on (activated) when the first signal and the second signal are identical.

The differential circuit can include a first transistor and a second transistor, with the first transistor having the first signal from the serializer inputted to its gate and having its source connected to a current source, and the second transistor having the second signal from the serializer inputted to its gate and having its source connected to a current source. A first output terminal can be connected to a drain of the first transistor, a second output terminal can be connected to a drain of the second transistor, and the control circuit can include a third transistor, which may have a strobe signal inputted to its gate and which may have its source connected to a current source.

The third transistor can be turned on by the strobe signal if the first signal and the second signal from the serializer are identical.

The receiving apparatus can include: a decoder configured to receive the inverted first signal and second signal as differential data and decode the inverted first signal and second signal; a deserializer configured to receive the input data recovered by the decoder; and a delay locked line configured to receive the transition information recovered by the decoder to recover a clock, where the deserializer can parallelize the input data by using the clock recovered from the transition information at the delay locked line.

The decoder can include: an input data recovery part configured to receive the inverted first signal and second signal as differential data and recover the input data; and a transition information recovery part configured to receive the inverted first signal and second signal as differential data and recover the transition information.

The input data recovery part can include an SR NAND latch, and the transition information recovery part can include a NAND logic gate having two outputs.

Another aspect of the invention provides a system for automatically tracking data speed that includes: a transmitting apparatus configured to convert parallelized input data according to a preset signal rule into a first signal and a second signal, serialize the first signal and the second signal, and transmit the serialized first signal and second signal, where the input data is inputted as a unit of n bits, and the first signal and the second signal are outputted such that, if the input data includes identical bit values consecutively, one of the first signal and the second signal is converted to include transition information instead of following a differential rule with respect to the other signal; and a receiving apparatus configured to receive the inverted first signal and second signal as differential data, decode the inverted first signal and second signal, and receive the transition information recovered by the decoding to recover a clock.

Certain embodiments of the invention can reduce transmission lines by transmitting data without overhead, alleviate problems related to the limit on data transmission speed and DC balance, and decrease the complexity, area, and power consumption of the system by an implementation that is simpler compared to existing technology for recovering a clock without overhead by finding regularity.

Additional aspects and advantages of the present invention will be set forth in part in the description which follows, and in part will be obvious from the description, or may be learned by practice of the invention.

BRIEF DESCRIPTION OF THE DRAWINGS

FIG. 1 illustrates a conversion diagram for a signal rule for the automatic tracking of data speed.

DETAILED DESCRIPTION

Figure 2:
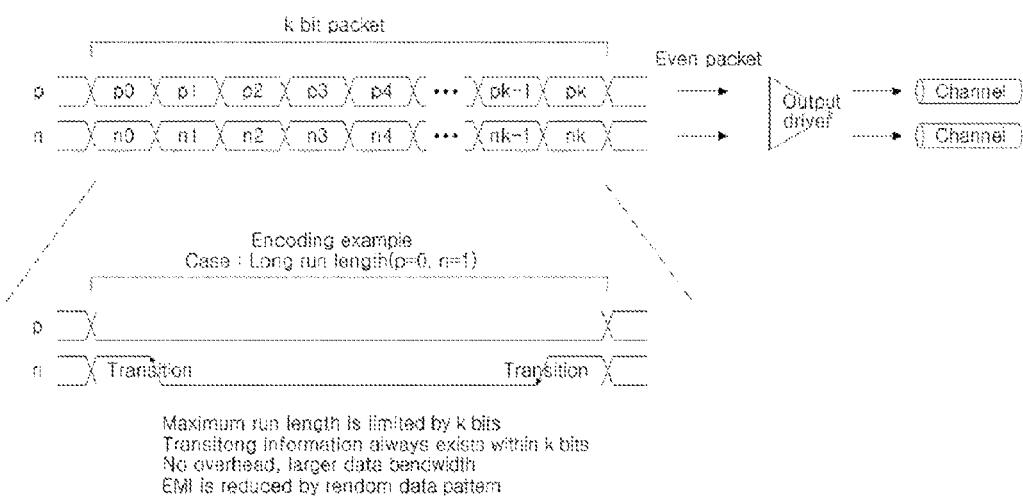
FIG. 2 illustrates signals having transition information inserted therein according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings. To aid the overall understanding of the invention, like reference numerals are used for like elements regardless of the figure number.

FIG. 1 illustrates a conversion diagram for a signal rule for the automatic tracking of data speed.

In FIG. 1, the P branch and the N branch each represent a basically differential signal. FIG. 1 represents the rule by which data being transmitted from a transmitting apparatus to a receiving apparatus is converted.

According to an embodiment of the invention, data of a particular number of bits may be grouped as a packet, which may then be converted and transmitted. FIG. 1 shows an example in which three bits are grouped into a packet and converted.

The number of bits that are grouped into one packet can be increased or decreased according to an arrangement between the transmitting and receiving apparatuses.

The left side of an arrow shows the bit values before conversion, i.e. the input data, while the right side of the arrow shows the bit values after conversion. FIG. 2 illustrates signals having transition information inserted therein according to an embodiment of the invention.

According to an embodiment of the invention, it is possible to recover clock information at the receiving end without inserting clock information in the middle of the data, by departing from the differential signal rule and inserting transition information into one of the two signals corresponding to differential channels when the input data is a consecutive signal, as in FIG. 1 and FIG. 2.

Here, a consecutive signal can be defined as data in which the same bit values continue consecutively without transition information. In a case where n bits are grouped into one packet, data that includes identical bit values consecutively can have some of the bit values into other bit values, in a departure from the differential rule, by the transmitting apparatus according to an embodiment of the invention.

For differential channels, the input data of 000 should be converted to 111 at the P branch and kept at 000 at the N branch, but as described above, a transmitting apparatus according to this embodiment may have the 000 converted to 101 at the P branch, departing from the differential rule, in order to allow a recovery of the clock information at the receiving end.

Also, whereas the input data of 111 should be converted to 000 at the P branch and kept at 111 at the N branch, a transmitting apparatus according to this embodiment may have the 111 converted to 101 at the N branch, in a departure from the differential rule, to allow a recovery of the clock information at the receiving end.

According to an embodiment of the invention, for a case in which input data is packetized into units of n bits, if the input data is 0 repeated consecutively or 1 repeated consecutively, the transmitting apparatus may apply conversion such that the first signal of the differential channels has 0 or 1 repeated consecutively, while the second signal includes transition information instead of following the differential rule.

In FIG. 1, the first signal can be a signal corresponding to the N branch, and the second signal can be a signal corresponding to the P branch.

The reason for thus applying conversion such that one of the two signals of the differential channels does not follow the differential rule is to provide an effect of inputting differential data at the decoder of the receiving apparatus, as described below.

With this conversion method, the transmitting apparatus can transmit information on a reference clock to the receiving apparatus without overhead by limiting the run length.

Figure 3:
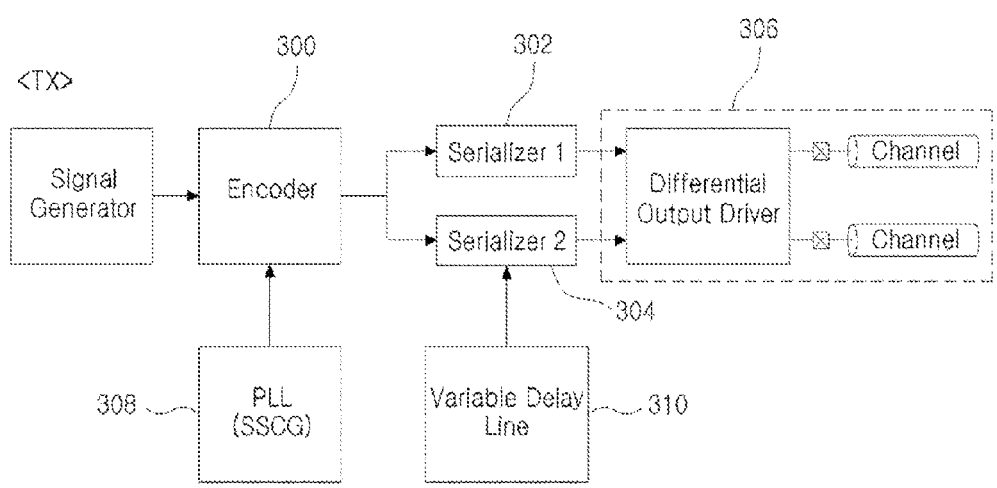
FIG. 3 is a block diagram of a transmitting apparatus for automatically tracking data speed according to an embodiment of the invention.

FIG. 3 is a block diagram of a transmitting apparatus for automatically tracking data speed according to an embodiment of the invention.

As illustrated in FIG. 3, a transmitting apparatus according to an embodiment of the invention can include an encoder 300, a first serializer 302, a second serializer 304, and a transmitting part 306.

The encoder 300 may receive the input data of n bits generated at a signal generator and may convert the input data according to a preset signal rule, such as that shown in FIG. 1, into a first signal and a second signal.

Here, if the input data has the same bit value repeated consecutively, the encoder 300 may convert any one of the first signal or the second signal such that at least some of the bit values are changed to different bit values instead of following the differential rule. The signal thus converted can be defined as the transition information.

The first signal outputted by the encoder 300 may be serialized by the first serializer 302, and the second signal may be serialized by the second serializer 304, to be transmitted by way of the transmitting part 306 to the channels.

According to an embodiment of the invention, the transmitting part 306 can include a differential output driver.

Figure 4:
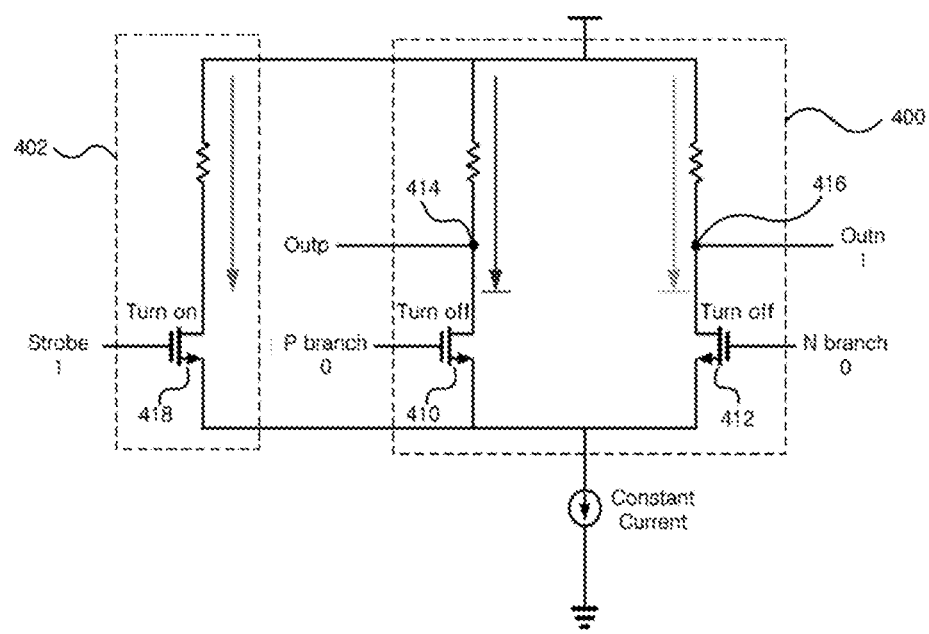
FIG. 4 illustrates the detailed composition of a differential output driver according to an embodiment of the invention.

FIG. 4 illustrates the detailed composition of a differential output driver according to an embodiment of the invention.

Referring to FIG. 4, a differential output driver according to an embodiment of the invention can include a differential circuit 400, which may be composed of multiple switches, and a control circuit 402, which may be turned on (activated) when the two inputs are identical.

To be more specific, a differential circuit 400 according to this embodiment can include a first transistor 410, which may have the first signal inputted to its gate and may have its source connected to a current source, and a second transistor 412, which may have the second signal inputted to its gate and may have its source connected to a current source.

Here, a first output terminal 414 may be connected to the drain of the first transistor 410, and a second output terminal 416 may be connected to the drain of the second transistor.

A control circuit 402 according to this embodiment can include a third transistor 418, which may have a strobe signal inputted to its gate and may have its source connected to a current source.

According to an embodiment of the invention, the control circuit 402 may be a circuit for preventing the occurrence of noise when the identical signals are inputted to the gates of the first transistor 410 and second transistor 412.

As illustrated in FIG. 4, when the same signal (0) is inputted to the first and second transistors 410, 412, a high signal (1) may be inputted to the gate of the third transistor 418, and the third transistor 418 may be turned on, so that the differential operation may be broken and the input of noise may be prevented.

When a differential output driver such as that shown in FIG. 4 is used, the input of noise can be prevented, and the first signal and second signal inputted to the gates of the first and second transistors 410, 412 may be inverted and outputted through the first and second output terminals 414, 416.

In FIG. 3, the transmitting apparatus according to an embodiment of the invention can further include a phase locked loop 308 and a variable delay line 310.

The phase locked loop 308 may provide the encoder 300 with a clock divided to allow a grouping of a preset number of bits into a packet, by using a reference clock.

Also, the variable delay line 310 may be supplied with a half-rate clock from the phase locked loop to compensate for skew.

Figure 5:
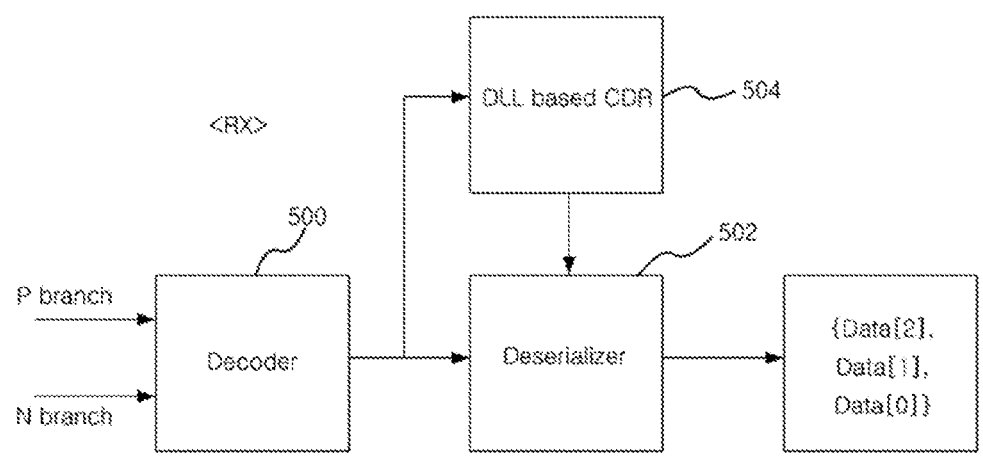
FIG. 5 is a block diagram of a receiving apparatus for automatically tracking data speed according to an embodiment of the invention.

FIG. 5 is a block diagram of a receiving apparatus for automatically tracking data speed according to an embodiment of the invention.

As illustrated in FIG. 5, a receiving apparatus according to an embodiment of the invention can include a decoder 500, a deserializer (parallelizer) 502, and a delay locked line (Delay Locked Loop based Clock and Data Recovery) 504.

The decoder 500 may receive input of the first signal and second signal transmitted from the transmitting apparatus to recover the input data, i.e. the original data, as well as the transition information.

A decoder 500 according to this embodiment can include an input data recovery part and a transition information recovery part.

Figure 6:
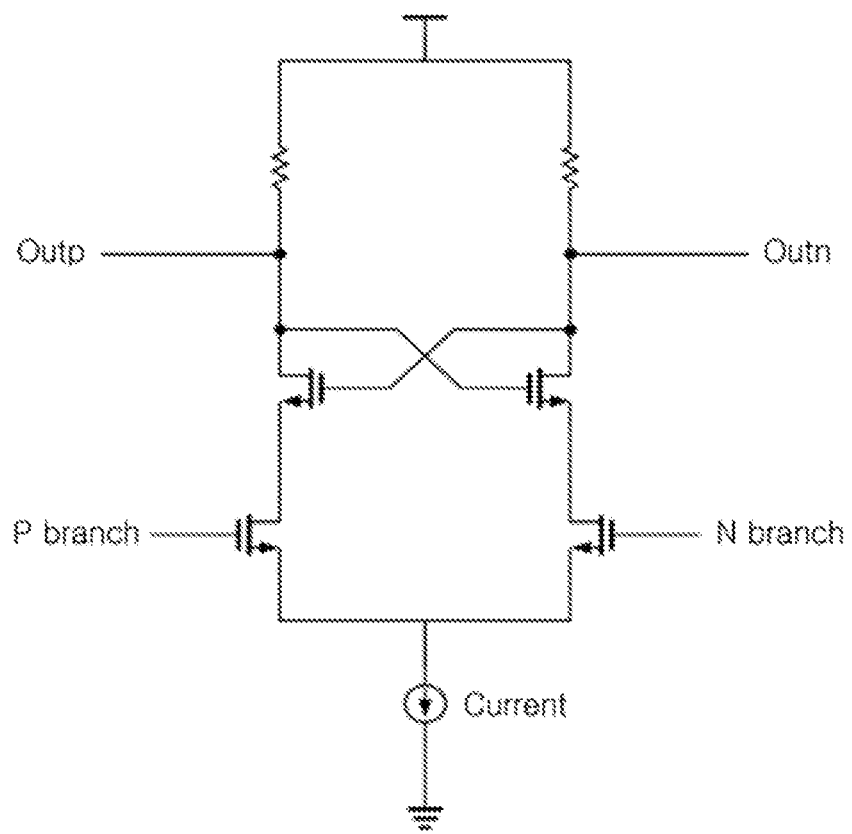
FIG. 6 illustrates the detailed composition of an input data recovery part according to an embodiment of the invention.

FIG. 6 illustrates the detailed composition of an input data recovery part according to an embodiment of the invention.

As illustrated in FIG. 6, the input data recovery part can have a structure in which a CML (Current Mode Logic) amp and an SR latch are combined.

Preferably, the input data recovery part can be an SR NAND latch including a NAND logic gate.

A description is provided below on the operation of the input data recovery part when the input data is 000 in the arrangement of FIG. 1.

If the input data is 000, the signal corresponding to the P branch may be converted to 101, and the signal corresponding to the N branch may be left at 000.

By the differential output driver described above with reference to FIG. 4, 101 may be inverted to 010, and 000 may be inverted to 111, to be inputted to the decoder 500 of the receiving end.

If the first signal and the second signal are differential signals, for example if the first signal is 0 (low) and the second signal is 1 (high), then an SR latch according to this embodiment may output 1 to the first output terminal (Outp) and output 0 to the second output terminal (Outn).

Afterwards, when the first signal is 1 and the second signal is 1, the SR latch may maintain its previous state and output 1 to the first output terminal and output 0 to the second output terminal.

Next, when the first signal is inputted as 0 and the second signal is inputted as 1, the first output terminal may output 1, and the second output terminal may output 0.

Here, the 000 outputted at the second output terminal (outn) is the recovered input data.

Figure 7:
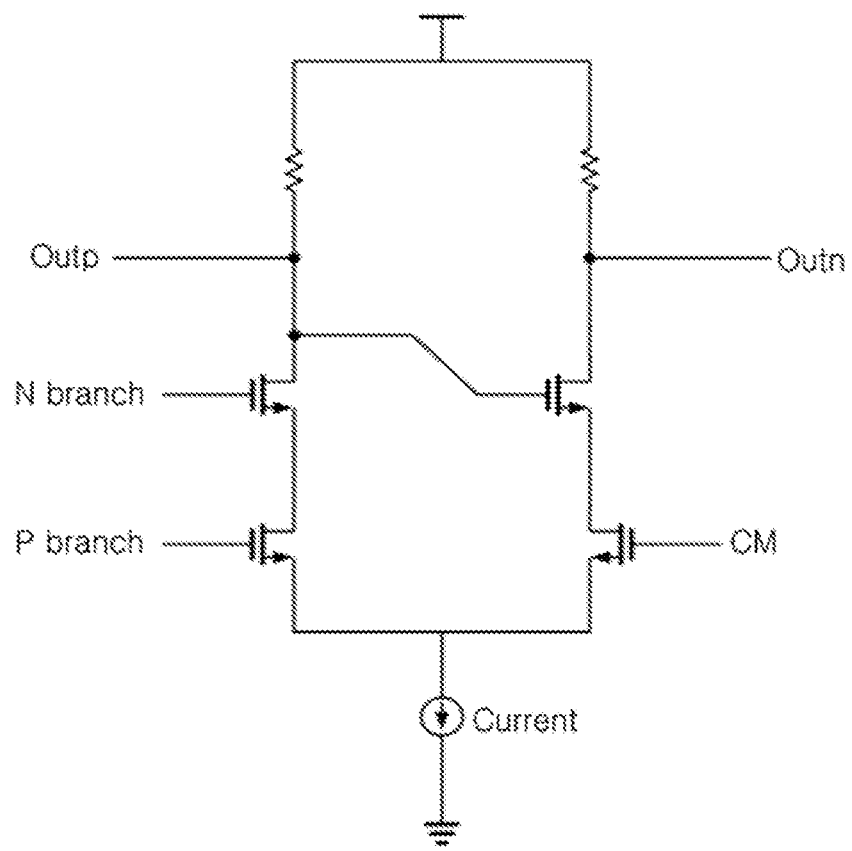
FIG. 7 illustrates the detailed composition of a transition information recovery part according to an embodiment of the invention.

According to an embodiment of the invention, an SR latch such as that shown in FIG. 6 can be used to recover the original signals, and a circuit such as that shown in FIG. 7 can be used to recover a clock.

FIG. 7 illustrates the detailed composition of a transition information recovery part according to an embodiment of the invention.

As illustrated in FIG. 7, a transition information recovery part according to this embodiment can include a NAND logic gate.

Referring to FIG. 7, for the case in which the input data is 000, and 0, 1, 0 are inputted sequentially to the P branch of the differential channels and 1, 1, 1 are inputted sequentially to the N branch of the differential channels, 1, 0, 1 may be outputted at the first output terminal (outp), and 0, 1, 0 may be outputted at the second output terminal (outn).

Thus, by virtue of the NAND logic gate of FIG. 7, the transition information additionally inserted by the transmitting apparatus can be recovered, and the two output signals can be inputted to the delay locked line 504.

The delay locked line 504 can recover the clock from the input signals, and can sequentially read the data that was outputted from the SR latch of the decoder 500 and inputted to the deserializer 502.

The embodiments of the invention described above are disclosed herein for illustrative purposes only. It is to be appreciated that various modifications, alterations, and additions can be made by those of ordinary skill in the art without departing from the technical spirit and scope of the invention, and that such modifications, alterations, and additions are encompassed by the scope of claims set forth below.

What is claimed is:

1. A transmitting apparatus for automatically tracking data speed, the apparatus comprising:
   an encoder configured to convert parallelized input data according to a preset signal rule into a first signal and a second signal, the input data inputted as a unit of n bits, where n is an integer greater than two, wherein the encoder outputs the first signal and the second signal such that, if the input data includes identical bit values consecutively, one of the first signal and the second signal is converted to include transition information instead of following a differential rule with respect to the other signal;
   a serializer configured to serialize the first signal and the second signal;
   a transmitting part configured to transmit the serialized first signal and second signal; and a differential output driver configured to receive the first signal and the second signal as differential signals from the serializer and output an inverted first signal and an inverted second signal, wherein the transmitting part transmits the inverted first signal and second signal to a receiving apparatus, and the differential output driver comprises a differential circuit and a control circuit, the differential circuit composed of a plurality of switches, the control circuit configured to be turned on when the first signal and the second signal are identical.

2. The apparatus of claim 1, wherein the differential circuit comprises a first transistor and a second transistor, the first transistor having the first signal from the serializer inputted to a gate thereof and having a source thereof connected to a current source, the second transistor having the second signal from the serializer inputted to a gate thereof and having a source thereof connected to a current source, a first output terminal is connected to a drain of the first transistor, a second output terminal is connected to a drain of the second transistor, and the control circuit comprises a third transistor, the third transistor having a strobe signal inputted to a gate thereof and having a source thereof connected to a current source.

3. The apparatus of claim 2, wherein the third transistor is turned on by the strobe signal if the first signal and the second signal from the serializer are identical.

4. The apparatus of claim 1, wherein the receiving apparatus comprises:

a decoder configured to receive the inverted first signal and the inverted second signal as differential data and decode the inverted first signal and the inverted second signal;

a deserializer configured to receive the input data; and a delay locked line configured to receive the transition information to recover a clock, wherein the deserializer parallelizes the input data by using the clock recovered from the transition information at the delay locked line.

5. The apparatus of claim 4, wherein the decoder comprises:

an input data recovery part configured to receive the inverted first signal and the inverted second signal as differential data and recover the input data; and a transition information recovery part configured to receive the inverted first signal and the inverted second signal as differential data and recover the transition information.

6. The apparatus of claim 5, wherein the input data recovery part comprises an SR NAND latch and the transition information recovery part comprises a NAND logic gate having two outputs.

7. A system for automatically tracking data speed, the system comprising:

a transmitting apparatus configured to convert parallelized input data according to a preset signal rule into a first signal and a second signal, serialize the first signal and the second signal, and transmit the serialized first signal and second signal, wherein the input data is inputted as a unit of n bits, where n is an integer greater than two, and the first signal and the second signal are outputted such that, if the input data includes identical bit values consecutively, one of the first signal and the second signal is converted to include transition information instead of following a differential rule with respect to the other signal; and a receiving apparatus configured to receive the first signal and second signal as differential data, decode the first signal and second signal, and receive the transition information, wherein the transmitting apparatus comprises a differential output driver configured to receive the serialized first signal and second signal as differential signals and output the first signal and the the inverted second signal in inverted forms, the inverted first signal and second signal being transmitted to the receiving apparatus, and wherein the differential output driver comprises a differential circuit and a control circuit, the differential circuit composed of a plurality of switches, the control circuit configured to be turned on when the first signal and the second signal are identical.

8. The system of claim 7, wherein the differential circuit comprises a first transistor and a second transistor, the first transistor having the serialized first signal inputted to a gate thereof and having a source thereof connected to a current source, the second transistor having the serialized second signal inputted to a gate thereof and having a source thereof connected to a current source, a first output terminal is connected to a drain of the first transistor, a second output terminal is connected to a drain of the second transistor, and the control circuit comprises a third transistor, the third transistor having a strobe signal inputted to a gate thereof and having a source thereof connected to a current source.

9. The system of claim 8, wherein the third transistor is turned on by the strobe signal if the first signal and the second signal from the serializer are identical.

10. The system of claim 7, wherein the receiving apparatus comprises an SR NAND latch and a NAND logic gate and receives the inverted first signal and second signal, the SR NAND latch recovers the input data, and the NAND logic gate recovers the transition information.

* * * * *